Feb. 22, 1944.	H. H. PELZER	2,342,554
AUTOGRAPHIC REGISTER
Filed Feb. 3, 1943	7 Sheets-Sheet 1
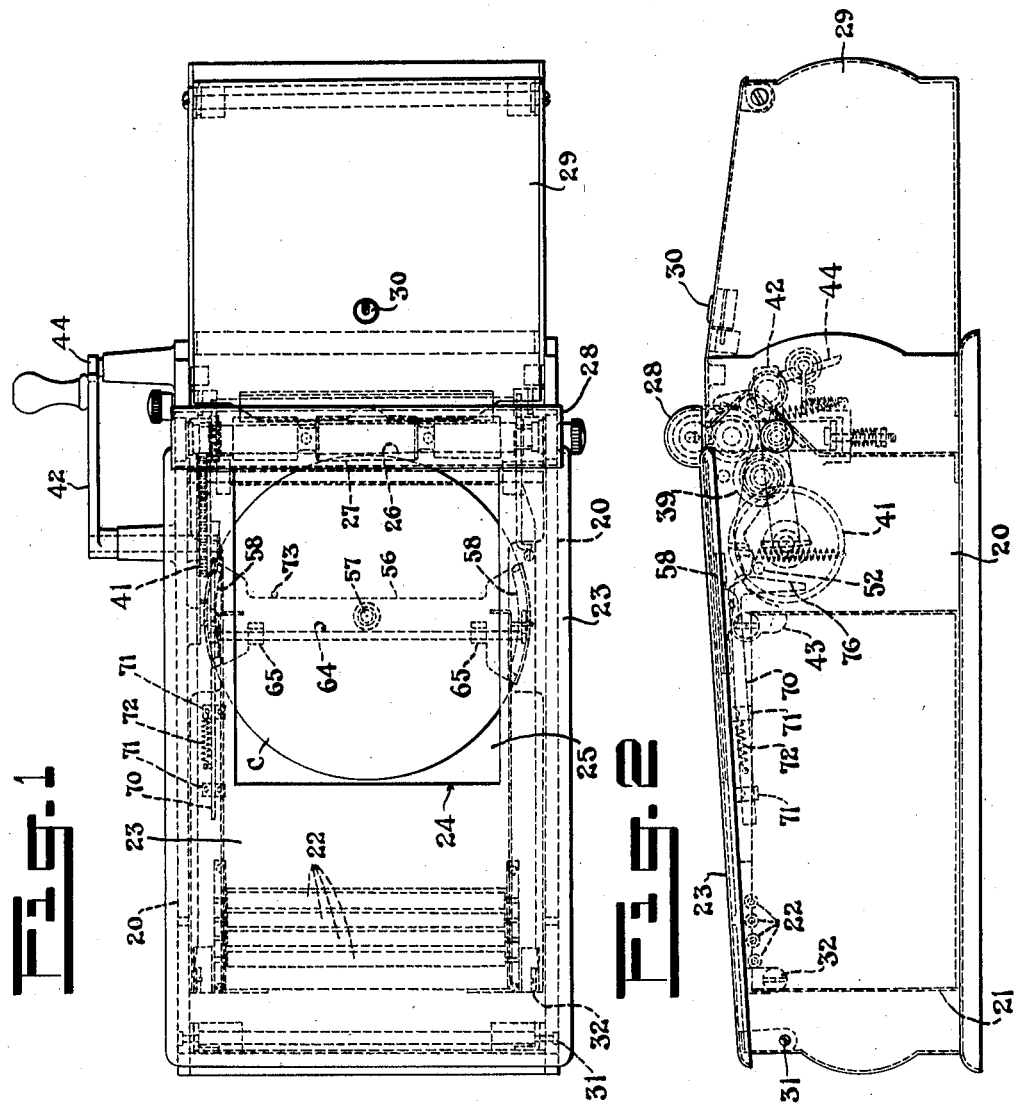
INVENTOR.
HAROLD H. PELZER
BY
*Bohleber, Fassett & Montstream*
ATTORNEYS Feb. 22, 1944.     H. H. PELZER     2,342,554
AUTOGRAPHIC REGISTER
Filed Feb. 3, 1943     7 Sheets-Sheet 2
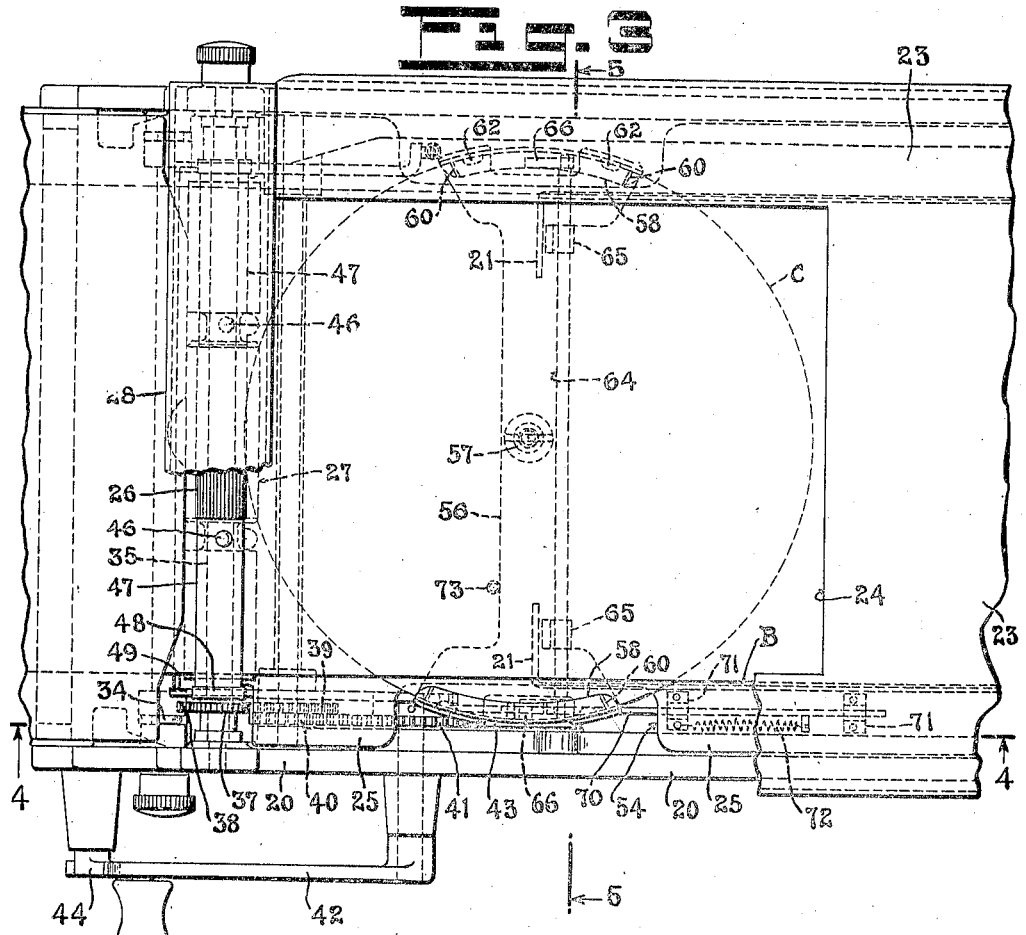
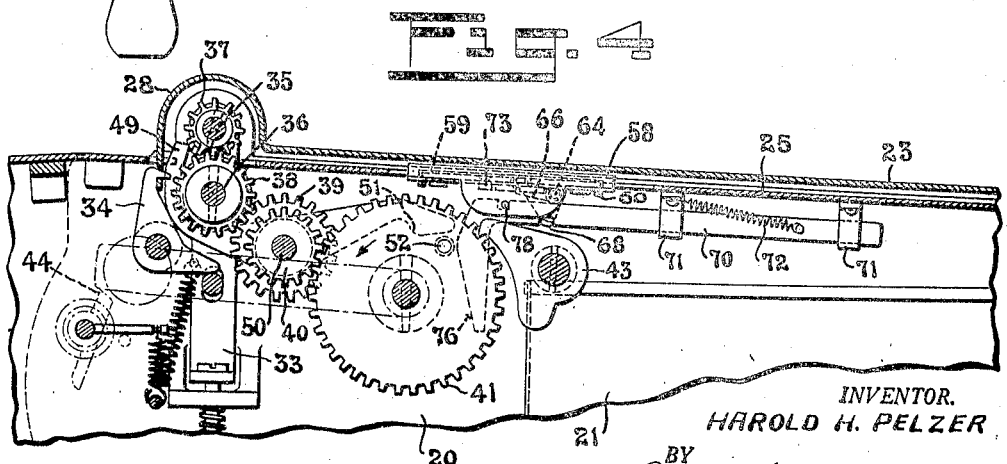
INVENTOR.
HAROLD H. PELZER
BY
Bohleber, Fassett & Montstream
ATTORNEYS

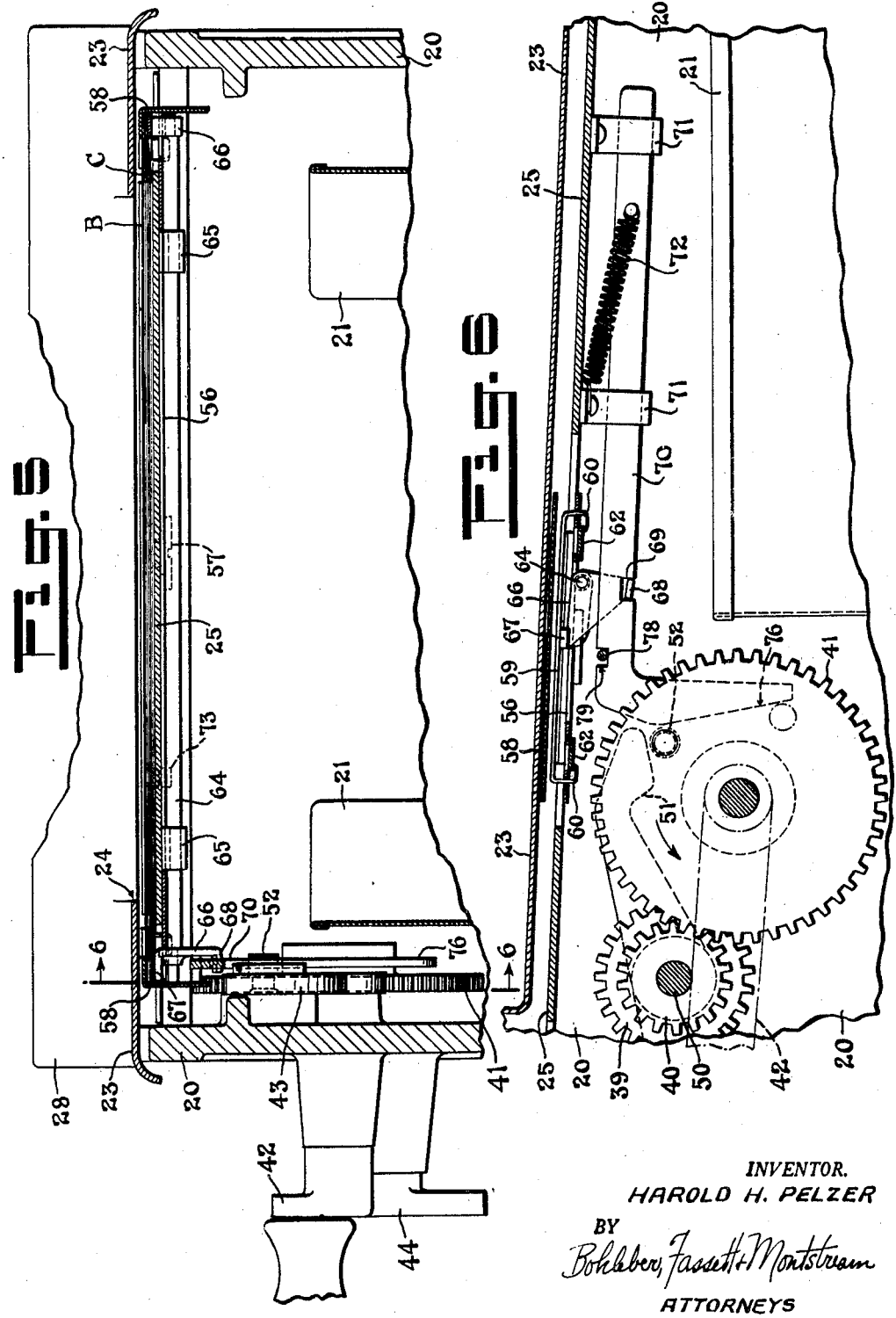

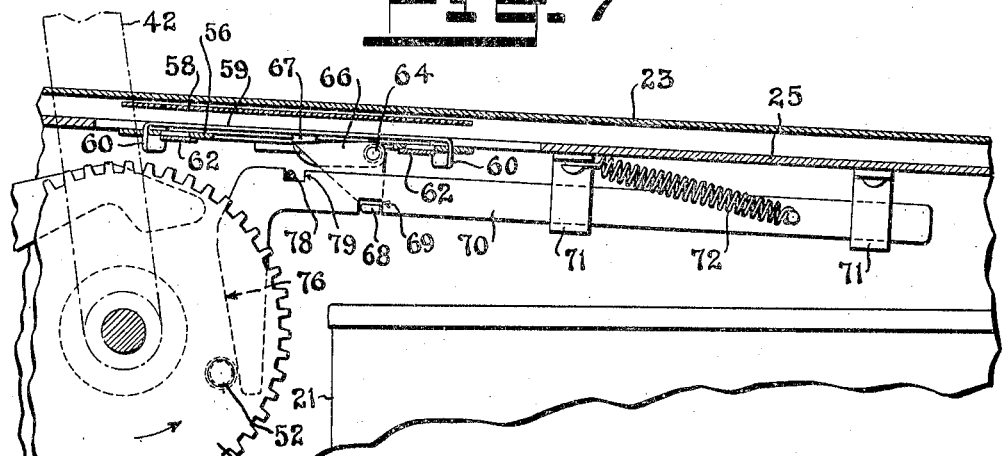
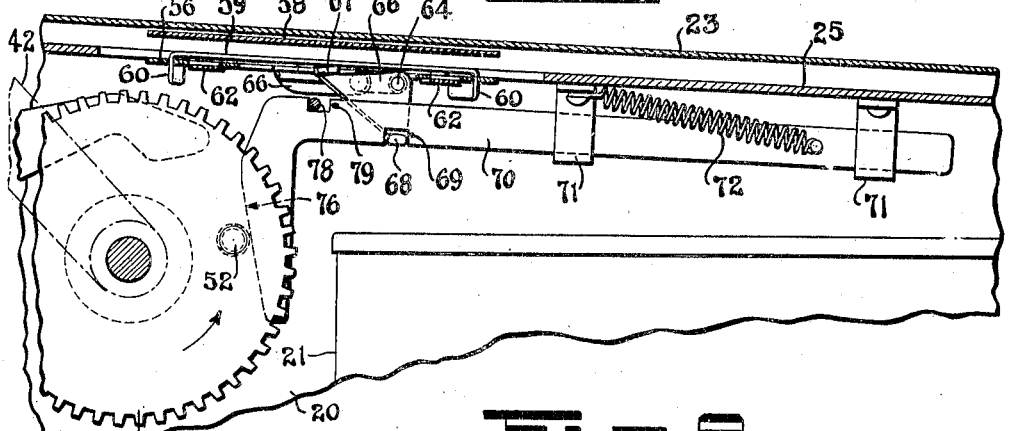
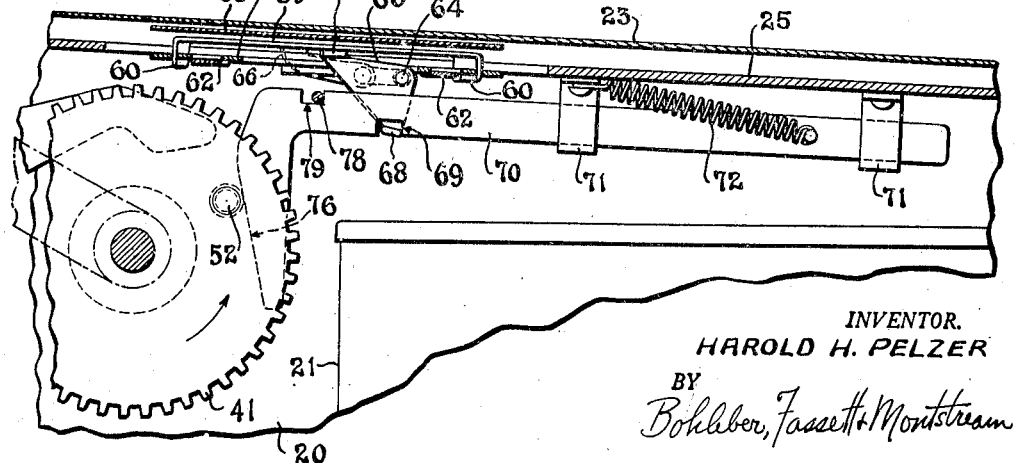

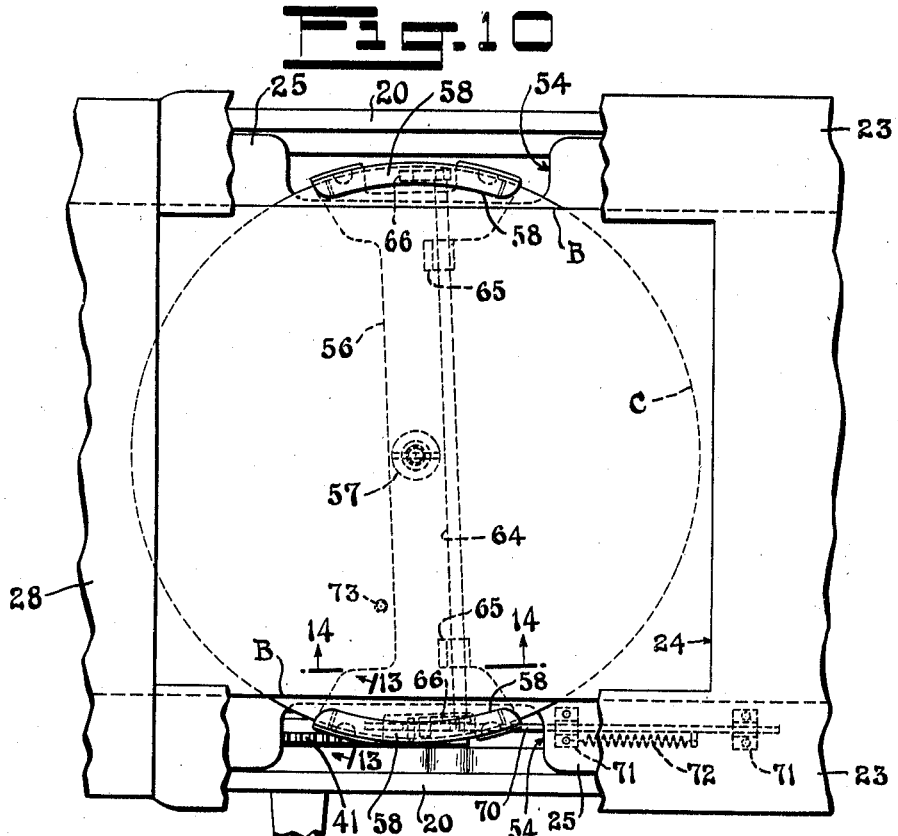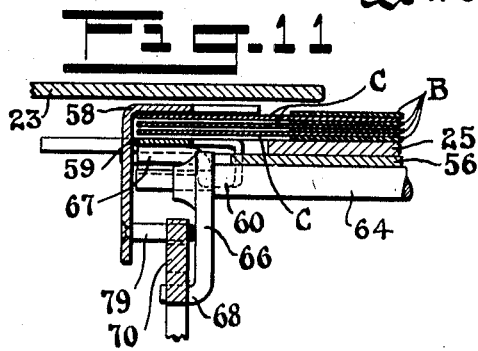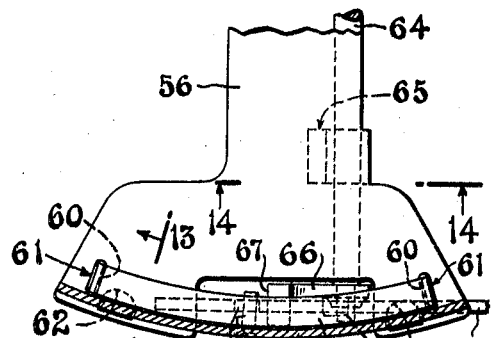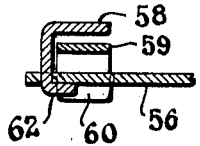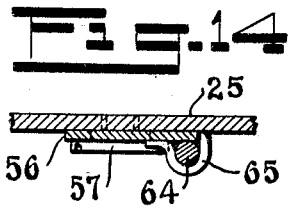

Feb. 22, 1944.   H. H. PELZER   2,342,554
AUTOGRAPHIC REGISTER
Filed Feb. 3, 1943   7 Sheets-Sheet 6
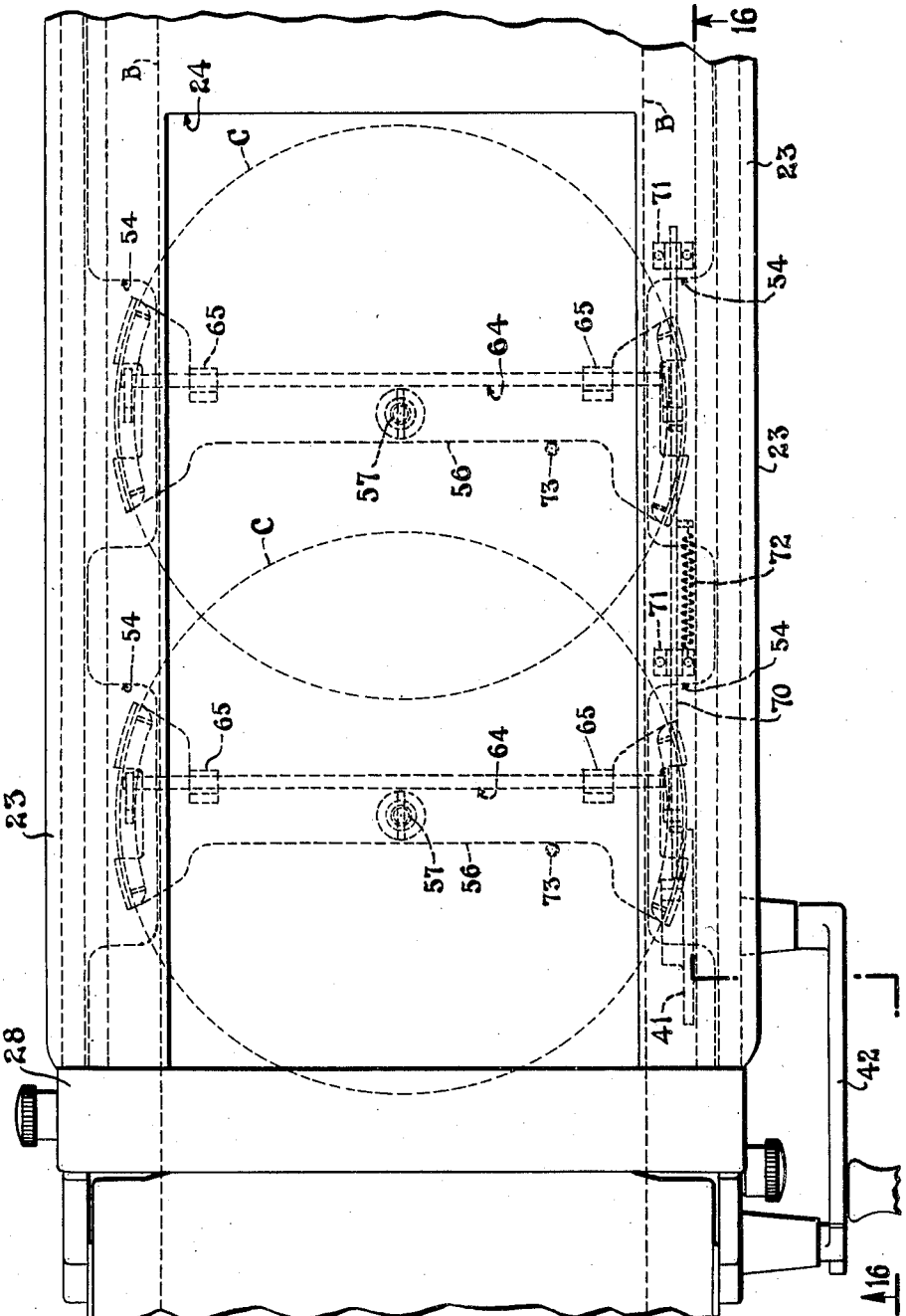
INVENTOR.
HAROLD H. PELZER
BY
Bohleber, Fassett + Montstream
ATTORNEYS

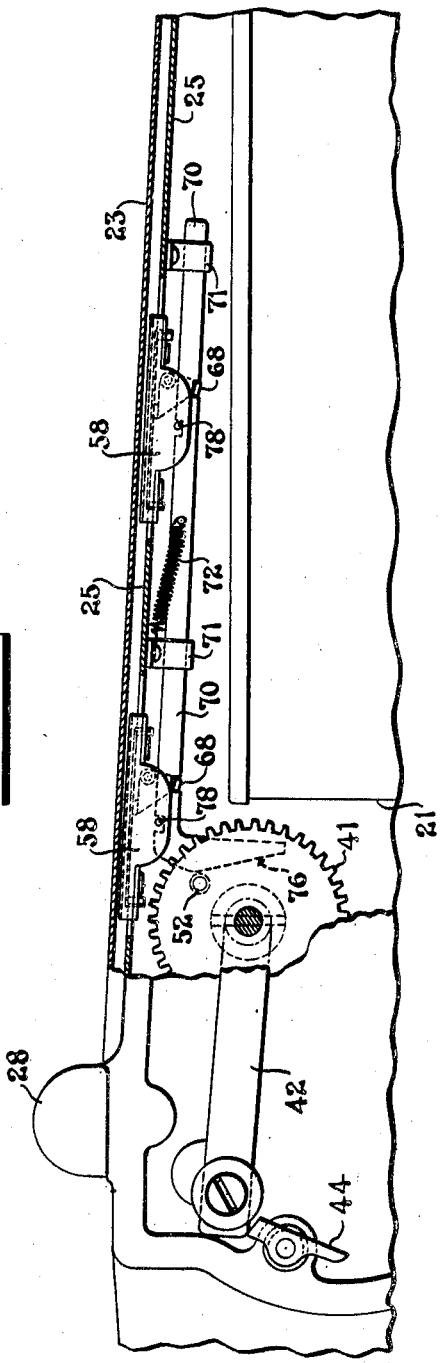
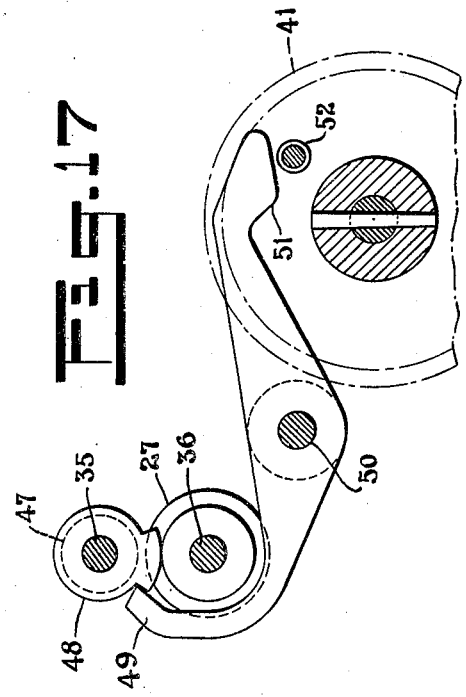

Patented Feb. 22, 1944

2,342,554

UNITED STATES PATENT OFFICE 2,342,554

AUTOGRAPHIC REGISTER

Harold H. Pelzer, Astoria, Long Island, N. Y., assignor to Philip J. Schulman, New York, N. Y.

Application February 3, 1943, Serial No. 474,532

36 Claims. (Cl. 282—5)

The invention relates to an autographic register in which a plurality of bands or series of detachable sheets, pass over a writing plate or position and carbon sheets are retained between the bands so that a desired number of copies of an autographic record or inscription may be obtained. The bands of sheets may be folded or carried on rolls.

Autographic registers are constructed with the record sheets or bands extending and moving lengthwise thereof and with a plurality of bands of carbon paper extending and moving crosswise of the record sheets so that a plurality of records may be made. These bands of carbon sheets may be advanced usually manually upon the feeding of a new form or additional record paper to the writing position. Autographic registers as used usually record a few lines only at the top of the sheet which means that much of the lower portion of the carbon sheet has no more than a few marks thereupon and is largely unused. Such bands of carbon paper are expensive and wasteful since they are only half or less than half used.

The autographic register to be described herein utilizes a circular carbon sheet or sheets which are rotated a small portion of a revolution at predetermined intervals, so that the top of the carbon sheet moves to a side position, later reaches a bottom position, then later a position on the other side of the writing position. The unused or slightly used bottom part likewise moves towards the top so that eventually the entire carbon sheet gets substantially a uniform use. The maximum use of the carbon sheet is further augmented by the fact that the carbon sheet is angularly displaced when it is shifted which further assures maximum use of the carbon sheets.

It is an object of the invention to construct an autographic register utilizing one or more circular carbon sheets, which carbon sheets are rotated a predetermined extent at certain intervals.

Another object of the invention is to construct an autographic register which uses circular carbon sheets which are automatically rotated a predetermined extent for each new blank or record sheet which is moved to writing position in the register.

Another object of the invention is to construct an autographic register utilizing one or more circular carbon sheets in which the sheets are held at their periphery during the recording or writing upon the register sheet and during the withdrawal of inscribed sheets from and the advancing of new sheets to the writing position and also rotates the carbon sheet a predetermined extent while the invoices or record sheets are stationary.

Another object is to construct an autographic register utilizing a circular carbon sheet and having simple and effective mechanism which rotates the carbon sheet a predetermined extent at certain intervals.

Another object of the invention is to construct an autographic register which uses circular carbon sheets in which the carbon sheet shifting mechnism is carried upon a hinged writing plate thereby affording easy access to the mechanism for installation and repair.

A further object is to construct a mechanism which uses circular carbon sheets which can be mounted upon existing autographic registers or substituted for the carbon sheet mechanism provided thereupon.

A still further object of the invention is to construct an autographic register utilizing circular carbon sheets between the record sheets in which tandem mounting of the circular carbon sheets is utilized to provide for a longer record sheet than can be accommodated with a single circular carbon sheet.

Other objects of the invention will be more apparent from the following description taken in connection with the accompanying drawings illustrating preferred embodiments thereof.

Figure 1 is a general plan view of an autographic register constructed to utilize a circular carbon sheet.

Figure 2 is a side elevation of the autographic register.

Figure 3 is an enlarged plan view of the writing position of the autographic register showing the feed rollers and the mechanism for the circular carbon sheets.

Figure 4 is an enlarged side view of the register at the writing position and with the casing in section to show the mechanism by which the record sheets are fed over the writing plate or position and illustrates also the mechanism for obtaining clamping and rotation of the carbon sheets.

Figure 5 is a partial cross-section through the autographic register taken on line 5—5 of Figure 3 and shows the mechanism by which the carbon sheets are gripped at their periphery and also shows the mechanism for moving the carbon sheets a predetermined extent.

Figure 6 is a partial longitudinal section through the register taken on line 6—6 of Figure 5 and shows details of the mechanism which provides step by step rotation of the carbon sheets.

Figure 7 is a partial longitudinal section similar to Figure 6, but shows the carbon shifting mechanism in a position in which the carbon clamping means has been released.

Figure 8 is a partial longitudinal section similar to Figures 6 and 7 but shows the carbon shifting mechanism moved to a point where the carbon clamping means has been shifted to a new position at the periphery of the circular carbon sheet.

Figure 9 is a partial longitudinal section similar to Figures 6 through 8 but shows the next step in the operation of the carbon shifting mechanism in that the clamping means has become engaged to grip the carbon sheet at a new point in its periphery. The next position is the same as that of Figure 6 with the carbon sheets shifted a predetermined extent.

Figure 10 is a top view of a portion of the autographic register at the writing position showing the position of the carbon clamping means corresponding to Figure 8 where the clamping means are ready to grip the carbon sheets and shift them to a predetermined extent of rotation.

Figure 11 is an enlarged partial section of the carbon sheet clamping means in released position with the carbon sheets therebetween and the mechanism which releases and engages the carbon sheet clamping means.

Figure 12 is an enlarged partial view of the clamping means and the end of a pivoted lever which carries the same.

Figure 13 is an enlarged detail sectional view taken on line 13—13 of Figure 12 of the clamping means.

Figure 14 is an enlarged cross sectional view through the pivoted lever showing the mechanism which connects the clamping means at opposite sides of the carbon sheet so that they operate in unison and the mounting of the connecting means upon the pivoted lever.

Figure 15 is an enlarged partial plan view of an autographic register utilizing a pair of sets of carbon sheets in tandem to provide for a longer writing position or sheet than can be accomodated by a single set of circular carbon sheets.

Figure 16 is a longitudinal partial section of the tandem mechanism taken on line 16—16 of Figure 15.

Figure 17 is a view of the mechanism which disables the record sheet feeding means.

The autographic register includes a box or frame 20 having a container or receptacle 21 of any suitable kind to hold the bands of blanks or record sheets. The particular receptacle illustrated is intended for connected folded blanks which are stored in a pile in the receptacle 21. It is clear that rolls of sheets may be provided rather than a stack of folded sheets if desired. Each band of blanks or sheets B passes around a roller 22 which is located underneath a cover 23. The cover has a window 24 exposing the sheets at the writing or inscribing position. A writing or backing plate 25 is beneath the sheets at the window to provide a writing surface and the carbon sheets are also located in this position, one carbon sheet being positioned between each band of record sheets.

The writing or record sheets B pass through a pair of feed rollers 26 and 27, Figure 3, which feed the paper from the storage receptacle 21 to the writing position. The sheets after passing through the feed rollers come out from beneath the end of a rounded hood 28 carried by the cover 23 and the edge of the hood serves as a cutting or tearing edge for tearing the writing sheets or inscribed record sheet from the band. One or more carbon copies, as desired, accumulate in the receiving receptacle 29 which may be locked against unauthorized access by a lock 30. The cover 23 may be hinged on a pivot 31 and the writing or backing plate 25 may be hinged on a pivot 32 so as to provide access for the mechanism of the autographic register and also to provide access to the storage receptacle. A latch 34, Figure 4, may be provided to hold the cover in closed position.

Any suitable sheet feeding means or mechanism may be utilized, that particularly illustrated including a pair of centrally located, knurled feed rollers 26 and 27, Figure 3 having a gear 37 upon the end of the shaft 35 for the upper roller 26 and a gear 38 on the end of the shaft 36 for the other or lower feed roller 27 which mesh together. A gear train connects with the gear 38 and includes the gears 39 and 40 the latter of which meshes with a large gear 41 to which a handle 42 is connected. Rotation of the handle rotates the feed rollers to feed the sheets through the writing position. A pawl 43 engages the teeth of the gear 41 in order to prevent reverse rotation of the handle, reverse the movement of the sheets at the writing position and withdrawal of the retained carbon copy from the locked storage receptacle 29. A pivoted stop 44 is provided in order to limit each rotation of the handle 42 to 360°. Any type of stop may be used which limits the rotation of the handle and is removable in order to permit another rotation thereof when another sheet is to be fed to writing position.

The gear ratio is so selected that it takes less than a complete revolution of the handle 42 to feed the full length of a new sheet into writing position. In the construction particularly illustrated, it takes about three-quarters of the revolution of the handle to so feed a new sheet into position. The remaining one-quarter of a revolution of the handle is available to rotate the carbon sheets while the writing sheets are stationary. By this construction there is no danger of the record sheets frictionally withdrawing the circular carbon sheets out of position since the latter are clamped throughout the entire movement of the writing sheet and are moved only when the record sheets are stationary.

Any suitable means may be used to disconnect or render ineffective the feeding rollers 26 and 27 for the balance of the revolution of the handle 42 after a new record blank has been completely moved into writing position. In the construction illustrated, one of the rollers and particularly the upper roller 26 is carried upon a spring pressed frame 33, Figure 4, so that, upon a new sheet being moved completely into writing position, the feed rollers are separated and upon continued rotation of the rollers the band of paper is not gripped therebetween and hence the sheets remain stationary even though the feed rollers are rotated.

The mechanism used and illustrated for accomplishing this result comprises a pair of spaced pins 46, Figure 3, each carried by a separate sleeve 47 and upon the end of each sleeve is a cam 48. The pin, sleeve and cam are mounted upon the ends of the same shaft 35 which carries the feed roller 26 so that the latter is between the two sleeves. The cam is normally engaged by a lever 49, Figure 4, pivoted on the shaft 50, and its other end has a cam surface 51 which is engaged by a roller 52 carried by the large gear 41. The pins 46 engage in holes in the writing sheets.

The feed roller releasing or disabling means operates in the following manner. In the initial rotation of the handle 42, the roller 52 engages the cam 51 moving the latch or lever 49 outwardly to release the cam 48. The pins 46, sleeves 47 and cams 48 rotate backwardly or counterclockwise, by frictional contact between the ends of each sleeve and the end of the feed roller 26. As the record sheets are fed by the feed rollers, the pins continue their rotation until they engage the blank sheets passing between the rollers. They are held in this position by the sheet until a perforation at the head of the next blank arrives at the pins which then project into the holes and the sleeves are frictionally rotated with the pins until the latter extend downwardly. This rotation of the sleeves brings the cam surface 48 into contact with the other feed roller or a surface provided thereon and forces the upper roller 26 upwardly or away from the lower feed roller 27 so that feeding of the blanks ceases. When this occurs the roller 52 carried by the gear 41 is approximately in the position shown in dot dash lines in Figure 6 and the handle has completed about three-fourths of its revolution.

The mechanism described to disable or render ineffective the record sheet feeding means, upon the partial rotation of the handle 42 and the gear 41 connected therewith, is merely illustrative and any suitable means or mechanism may be utilized. It is only necessary that there be sufficient rotation of the handle and the gear remaining in order to shift the carbon sheets at a time when the record sheets have halted in their movement.

Means are provided to shift the carbon sheets a predetermined extent at certain periods or intervals. This means may be independently operated but preferably it is connected with the record sheet feeding means so that it operates automatically and in timed sequence with the sheet feeding means. The carbon shifting and holding mechanism or means includes a pivoted lever 56 which is mounted upon a pivot 57, preferably secured to the backing plate 25. Each end of the pivoted lever 56, as shown in Figure 10, has a clamping means which includes a stationary clamping plate 58 which is carried by and hence movable with the pivoted lever. The fixed clamping plate is secured to the pivoted lever in any suitable fashion such as by means of the tabs 62, Figure 13. A movable clamping plate 59 has downwardly turned ends 60 which are received in slots 61 in the pivoted lever so that it may be propelled upwardly to grip the carbon sheets C between the two clamping plates and may be released for shifting the clamping means with respect to the carbon sheets. The backing plate 25 has a cut out 54 on each side thereof so that the clamping means can project therethrough.

The pivoted lever 56 carries a shaft 64 which is secured thereto in any suitable fashion such as by the bent over clips or tabs 65 carried by the lever. A pawl 66 is secured to each end of the shaft. One pawl end 67 engages the movable clamping plate or member 59 to move it upwardly to grip the carbon sheets or to lower the same so that the carbon sheets are released. One of the pawls has a pawl end 68 which engages in a slot or recess 69 carried by a slidable member or slide bar 70 which is slidably retained in position by brackets 71 which preferably are carried by the backing plate. A spring 72 yieldably retains the slidable member or bar 70 to the left as shown in Figure 6. The spring 72 through the bar 70 and its slot 69 impels one pawl 66 in a clockwise direction and because both pawls are carried by the shaft 64, the other pawl is also so impelled as shown in Figures 6-9, to normally hold the clamping members in gripped relation upon the periphery of the carbon sheets C.

The slidable member 70 has a downwardly extending cam 76 as shown in Figures 6 through 9 so that when the roller 52 reaches the position shown in dot dash lines in Figure 6 it begins to engage the cam. Continued rotation of the handle 42 and gear 41 moves the roller 52 so that it pushes the slidable member 70 to the right as shown in Figures 7 and 8. The first or initial engagement of the roller 52 with the cam 76 moves the slidable member or slide bar 70 to the right and oscillates the pawls 66 in a contraclockwise direction to the position shown in Figure 7, to release the clamping means, that is to lower the movable clamping plate 58 away from the stationary clamping plate 59. Continued rotation of the handle continues the movement of the slidable bar to the right during which time the clamping means remains released until the initial return movement of the bar whereupon the sliding member 70 moves to the left and oscillates the pawls 66 in a clockwise direction to regrip the clamping means to grip the carbon sheets by forcing the movable clamping members 59 upwardly toward the clamping members 58 as shown in Figure 9.

Means are provided to oscillate the clamping means in one direction only after the same have been released and to oscillate the same in the other or return direction only after the clamping means has been gripped. Any suitable mechanism may be used for this purpose. The mechanism particularly illustrated oscillates the pivoted lever 56 and the clamping means carried thereby in one direction only after the clamping means has been released and oscillates the pivoted lever and hence the clamping means in a returned direction only after the clamping means has again gripped the carbon sheets. This means is preferably operated from the sheet feeding means so that it is timed in relation thereto to rotate the carbon sheets only when the inscribed or blank sheets are stationary.

The mechanism for accomplishing the operation described includes a pin 78 shown in Figures 6 through 9 which engages an elongated slot 79 provided in the slidable member 70. The pin 78 is carried by the pivoted lever 56 or particularly by an extension upon the stationary clamping plate 58 as illustrated in Figure 11. The pin initially is at the right-hand end of the elongated slot as shown in Figure 6 so that the pin, the pivoted lever and clamping means remain stationary during the initial movement of the slidable bar 70, during which initial movement the clamping pawls 66 are rotated and the clamping means is released as shown in Figure 7. Thereafter the left hand edge of the slot 79 engages the pin 78 to move the pivoted lever and clamping means a predetermined extent of movement which is determined by the throw of the cam 76 or the length of the slot or by both of these parts. This oscillation or movement of the clamping means and pivoted lever 56 is effected during the remainder of the movement of the slidable bar to the right and during the remainder of the engagement of the roller 52 with the cam surface 76 to the midpoint of the cam surface or the position illustrated in Figure 8. The complete movement described takes place in the rotation of the roller 52 from the position shown in dot dash lines in Figure 6 to that shown in Figure 8.

Upon continued rotation of the roller 52, the slidable member or bar 70 moves to the left by the action of the spring 72 and the pin 78 remains stationary during the initial return movement because of the elongated slot 79 while the clamping pawls 66 are swung in a clockwise direction to close the clamping means and grip the carbon sheets therein. The pin 78 thereupon is engaged by the right-hand edge of the slot 79 whereupon the pivoted lever and the clamping means are given a return movement, as shown in Figure 9 and the carbon sheets move therewith to shift the position of the latter. The elongated slot 79 therefore provides a lost motion connection between the sheet feeding means, or particularly the gear 41 thereof, and the pivoted lever or the carbon sheet shifting means or mechanism so that the clamping means may be first released and then moved in one direction and thereafter the clamping means may again be regripped to hold the carbon sheets after which the return movement of the pivoted lever and the clamping means takes place and the carbon sheets are moved therewith. It should also be observed that the spring 72 impelling the slidable bar 70 to the left, as shown in Figure 9, also resiliently impels the clamping pawls 66 in a clockwise direction at all times to firmly grip the carbon sheets within the clamping means at all times except during the first part of the carbon shifting movement. The spring 72 also normally retains the pivoted lever 56 in the position shown in Figure 3, with the lever engaging the stop 73.

The autographic register described herein embodies a new combination of means whereby a circular carbon sheet or sheets may be utilized. The particular construction of some of the means or mechanisms is unimportant so long as they perform the desired functions in cooperation with the mechanism for holding and shifting the circular carbon sheets. The construction of the invention is also devised so that the carbon clamping and shifting mechanism can be incorporated or substituted into existing autographic registers and the latter can use circular carbon sheets. The mechanism so constructed constitutes a subcombination of the complete autographic register combination.

The construction shown in Figures 1 through 14 is designed for a record sheet in which the inscribed portion is substantially square. Longer sheets may be provided for by utilizing a tandem mechanism illustrated in Figures 16 and 17. The mechanism for the tandem device is in all respects the same as for the device which uses a single set of carbon sheets excepting that it provides a duplication of parts and a longer slidable bar or member 70 to operate the two sets of carbon sheets. Since the parts making up the single and tandem mechanisms are otherwise alike, the single device already described is believed sufficient as to construction and operation of the tandem device and it is unnecessary to describe this tandem construction in detail. Like numerals in the tandem device of Figures 15 and 16 correspond with like parts in the single device shown in the other figures.

This invention is presented to fill a need for improvements in an autographic register. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An autographic register comprising means to contain a plurality of sheets, a writing position for the sheets, means to feed the sheets longitudinally only to the writing position, means to hold at least one circular carbon sheet substantially centrally of the writing position, and means to rotate the holding means for the carbon sheet or sheets a portion of a revolution at desired intervals.

2. An autographic register comprising means to contain a plurality of sheets, a writing position for the sheets, means to feed the sheets longitudinally only to the writing position, means to hold at least one circular carbon sheet at the writing position, and means operated by the feeding means to rotate the carbon sheet or sheets a portion of a revolution at predetermined intervals.

3. An autographic register comprising means to contain a plurality of sheets, a writing position for the sheets, means to feed the sheets to the writing position, clamping means to hold at least one circular carbon sheet at diametrically opposite points on its periphery at the writing position, and means to release the clamping means to move the same, regrip the clamping means and return the same to rotate the carbon sheet or sheets a portion of a revolution at desired intervals.

4. An autographic register comprising means to contain a plurality of sheets, a writing position for the sheets, means to feed the sheets to the writing position, clamping means to hold at least one circular carbon sheet at diametrically opposite points on its periphery at the writing position, and means operated by the feeding means to release the clamping means, rotate the same in one direction, regrip the clamping means and rotate the same in a return direction to rotate the carbon sheet or sheets a portion of a revolution at desired intervals.

5. An autographic register comprising means to contain a plurality of sheets, a writing position for the sheets, means to feed the sheets to the writing position, a lever pivoted between its ends, clamping means carried by the pivoted lever to hold at least one circular carbon sheet at diametrically opposite points on its periphery at the writing position, means to release and regrip the clamping means, means operable after the clamping means is released to oscillate the pivoted lever and clamping means and after the clamping means has been regripped to oscillate the pivoted lever and clamping means in a return direction to rotate the carbon sheet or sheets a portion of a revolution.

6. An automatic register comprising means to contain a plurality of sheets, a writing position for the sheets, means to feed the sheets to the writing position, a lever pivoted between its ends, clamping means carried by the pivoted lever to hold at least one circular carbon sheet at diametrically opposite points on its periphery at the writing position, means operated by the feeding means to release and regrip the clamping means, and means operable after the clamping means is released to oscillate the pivoted lever and clamping means in one direction and after the clamping means has been regripped to oscillate the pivoted lever and clamping means in a return direction to rotate the carbon sheet or sheets a portion of a revolution at predetermined intervals.

7. An autographic register comprising means to contain a plurality of sheets, a writing plate over which the sheets pass, means to feed the sheets over the writing plate, a lever pivoted between its ends upon the underside of the writing plate, clamping means carried by the pivoted lever to hold at least one circular carbon sheet at diametrically opposite points on its periphery at the writing plate, means operated by the feeding means to release and regrip the clamping means, and means operable after the clamping means is released to oscillate the pivoted lever and clamping means in one direction and after the clamping means has been regripped to oscillate the pivoted lever and clamping means in a return direction to rotate the carbon sheet or sheets a portion of a revolution at predetermined intervals.

8. An autographic register comprising means to contain a plurality of sheets, a writing plate over which the sheets pass, means to feed the sheets over the writing plate, a lever pivoted between its ends, clamping means carried by the pivoted lever to hold at least one circular carbon sheet at diametrically opposite points on its periphery over the writing plate, means to release and regrip the clamping means including a slide bar, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution.

9. An autographic register comprising means to contain a plurality of sheets, a writing plate over which the sheets pass, means to feed the sheets over the writing plate, a lever pivoted between its ends, clamping means carried by the pivoted lever to hold at least one circular carbon sheet at diametrically opposite points on its periphery over the writing plate, means to release and regrip the clamping means including a slide bar, a connection with the feeding means to move the slide bar after the sheets have been moved, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution.

10. An autographic register comprising means to contain a plurality of sheets, a writing plate over which the sheets pass, means to feed the sheets over the writing plate, a lever pivoted between its ends to the writing plate, clamping means carried by the pivoted lever to hold at least one circular carbon sheet at diametrically opposite points on its periphery and over the writing plate, means operated by the feeding means including a slide bar, a pawl for each clamping means connected with the slide bar and carried by the pivoted lever to release and regrip the clamping means, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

11. An autographic register comprising means to contain a plurality of sheets, a writing plate over which the sheets pass, means to feed the sheets over the writing plate, a lever pivoted between its ends to the writing plate, clamping means carried at each end of the pivoted lever to hold at least one circular carbon sheet at diametrically opposite points on its periphery and over the writing plate, a shaft carried by the pivoted lever, a pawl for each clamping means carried by the shaft to release and regrip the clamping means, means to oscillate the pawl, and means to oscillate the pivoted lever and clamping means in one direction after the clamping means is released and to oscillate the pivoted lever and clamping means in a return direction after the clamping means has been regripped to rotate the carbon sheet or sheets a portion of a revolution.

12. An autographic register comprising means to contain a plurality of sheets, a writing plate over which the sheets pass, means to feed the sheets over the writing plate, a lever pivoted between its ends to the writing plate, clamping means carried at each end of the pivoted lever to hold at least one circular carbon sheet at diametrically opposite points on its periphery and over the writing plate, a shaft carried by the pivoted lever, a pawl for each clamping means carried by the shaft to release and regrip the clamping means, a slidable member operated by the feeding means, a connection between the sliding member and a pawl to oscillate the latter, and a lost motion connection between the sliding member and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

13. An autographic register comprising means to contain a plurality of sheets, a writing plate over which the sheets pass, means to feed the sheets over the writing plate, a lever pivoted between its ends to the writing plate, clamping means carried at each end of the pivoted lever to hold at least one circular carbon sheet at diametrically opposite points on its periphery and over the writing plate, a shaft carried by the pivoted lever, a pawl for each clamping means carried by the shaft to release and regrip the clamping means, a connection between the operating means and the pawls to oscillate the latter, and a lost motion connection between the operating means and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

14. An autographic register comprising means to contain a plurality of sheets, a writing plate over which the sheets pass, means to feed the sheets over the writing plate, a lever pivoted between its ends to the writing plate, clamping means carried at each end of the pivoted lever to hold at least one circular carbon sheet at diametrically opposite points on its periphery and over the writing plate, a shaft carried by the pivoted lever, a pawl for each clamping means carried by the shaft to release and regrip the clamping means, means operated by the feeding means to oscillate the pawls, and means connected with the feeding means to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

15. An autographic register comprising means to contain a plurality of sheets, a writing plate over which the sheets pass, means to feed the sheets over the writing plate, a lever pivoted between its ends to the writing plate, clamping means carried at each end of the pivoted lever to hold at least one circular carbon sheet at diametrically opposite points on its periphery and over the writing plate including a fixed clamping plate and a movable clamping plate cooperating therewith, a shaft carried by the pivoted lever, a pawl for each movable clamping plate carried by the shaft to release and regrip the clamping means, means connected with the feeding means to oscillate the pawls, and a connection between the operating means and the pivoted lever to oscillate the pivoted lever and the clamping means in one direction after the clamping means is released and to oscillate the pivoted lever and clamping means in a return direction after the clamping means has been regripped to rotate the carbon sheet or sheets a portion of a revolution at redetermined intervals.

16. An autographic register comprising means to contain a plurality of sheets, a writing plate over which the record sheets pass, means to feed the record sheets over the writing plate, a lever pivoted between its ends, clamping means carried by the pivoted lever to hold at least one circular carbon sheet at diametrically opposite points on its periphery over the writing plate, means to release and regrip the clamping means, a slide bar connected with the next aforesaid means and operated in one direction by the record sheet feeding means, spring means urging the slide bar in the other direction and resiliently maintaining the clamping means in gripping relation, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

17. An autographic register comprising means to contain a plurality of sheets, a writing plate over which the record sheets pass, means to feed the record sheets over the writing plate, a lever pivoted between its ends, clamping means carried by the pivoted lever to hold at least one circular carbon sheet at diametrically opposite points on its periphery over the writing plate, means to release and regrip the clamping means, a slide bar carried upon the underside of the writing plate and connected with the record sheet feeding means to operate the same in one direction, spring means urging the slide bar in the other direction and resiliently maintaining the clamping means in gripping relation, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

18. An autographic register comprising means to contain a plurality of sheets, a writing plate over which the record sheets pass, means to feed the record sheets over the writing plate, a lever pivoted between its ends, clamping means carried by the pivoted lever to hold at least one circular carbon sheet at diametrically opposite points on its periphery over the writing plate, a slide bar, a cam carried by the slide bar and operated by the record sheet feeding means to operate the slide bar in one direction, spring means urging the slide bar in the other direction, means connected with the slide bar to release and regrip the clamping means, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

19. An autographic register comprising means to contain a plurality of sheets, a writing plate over which the record sheets pass, means to feed the record sheets over the writing plate, a lever pivoted between its ends, clamping means carried by the pivoted lever to hold at least one circular carbon sheet at diametrically opposite points on its periphery over the writing plate, and means to release and regrip the clamping means and to oscillate the same including a slide bar, a cam carried by the slide bar, means carried by the record sheet feeding means to engage the cam and operate the slide bar in one direction, spring means urging the slide bar in the other direction, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

20. A circular carbon sheet holding and shifting mechanism for an autographic register comprising a backing plate adapted to be secured to the register and provide a writing position, a lever pivoted between its ends to the backing plate, clamping means carried by the pivoted lever to hold at least one circular carbon sheet at diametrically opposite points on its periphery at the writing position, means to release and regrip the clamping means, and means operable after the clamping means is released to oscillate the pivoted lever and clamping means and after the clamping means has been regripped to oscillate the pivoted lever and clamping means in a return direction to rotate the carbon sheet or sheets a portion of a revolution.

21. A circular carbon sheet holding and shifting mechanism for an autographic register having record sheet feeding means comprising a backing plate adapted to be secured to a register and provide a writing position, a lever pivoted between its ends upon the underside of the backing plate, clamping means carried by the pivoted lever to hold at least one circular carbon sheet at diametrically opposite points on its periphery at the writing position, means adapted to be connected with and operated by the feeding means to release and regrip the clamping means, and means connected with the next aforesaid means and operable after the clamping means is released to oscillate the pivoted lever and clamping means in one direction and after the clamping means has been regripped to oscillate the pivoted lever and clamping means in a return direction to rotate the carbon sheet or sheets a portion of a revolution at predetermined intervals.

22. A circular carbon sheet holding and shifting mechanism for an autographic register having a record sheet feeding means comprising a backing plate adapted to be secured to a register and over which the record sheets pass, a lever pivoted between its ends to the backing plate, clamping means carried by the pivoted lever to hold at least one circular carbon sheet at diametrically opposite points on its periphery and over the backing plate, means to release and regrip the clamping means including a slide bar carried by the backing plate and adapted to be connected with the record sheet feeding means, and a lost motion connection between the slide bar and the pivoted lever to oscillate the pivoted lever and clamping means in one direction after the clamping means is released and to oscillate the pivoted lever and clamping means in a return direction after the clamping means has been regripped to move the carbon sheet or sheets a portion of a revolution at predetermined intervals.

23. A circular carbon sheet holding and shifting mechanism for an autographic register having a sheet feeding means comprising a backing plate adapted to be secured to a register and over which the sheets pass, a lever pivoted between its ends to the underside of the backing plate, clamping means carried by the pivoted lever to hold at least one circular carbon sheet at diametrically opposite points on its periphery over the backing plate, means to release and regrip the clamping means including a slide bar adapted to be connected with the record sheet feeding means of a register to move the slide bar, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution.

24. A circular carbon sheet holding and shifting mechanism for an autographic register comprising a backing plate adapted to be secured to a register, a lever pivoted between its ends to the underside of the backing plate, clamping means carried at each end of the pivoted lever to hold at least one circular carbon sheet at diametrically opposite points on its periphery and over the backing plate, a shaft carried by the pivoted lever, a pawl for each clamping means carried by the shaft to release and regrip the clamping means, means to oscillate the pawls, and means to oscillate the pivoted lever and clamping means in one direction after each clamping means is released by its pawl and to oscillate the pivoted lever and clamping means in a return direction after each clamping means has been regripped to rotate the carbon sheet or sheets a portion of a revolution.

25. A circular carbon sheet holding and shifting mechanism for an autographic register having a sheet feeding means comprising a backing plate adapted to be secured to a register, a lever pivoted between its ends to the underside of the backing plate, clamping means carried at each end of the pivoted lever to hold at least one circular carbon sheet at diametrically opposite points on its periphery and over the backing plate, a shaft carried by the pivoted lever, a pawl for each clamping means carried by the shaft to release and regrip the clamping means, a slidable member carried by the backing plate and positioned thereon so that it is adapted to be operated by the record sheet feeding means, a connection between the sliding member and a pawl to oscillate both pawls, and a lost motion connection between the slidable member and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

26. A carbon sheet holding and shifting mechanism for a circular carbon sheet for an autographic register comprising a backing plate adapted to be secured to a register, a lever pivoted between its ends to the underside of the backing plate, clamping means carried at each end of the pivoted lever to hold at least one circular carbon sheet at diametrically opposite points on its perpihery and over the backing plate including a fixed clamping plate and a movable clamping plate cooperating therewith, a shaft carried by the pivoted lever, a pawl for each movable clamping plate carried by the shaft to release and regrip the clamping means, means to oscillate the pawls to release and regrip the clamping means, and means to oscillate the pivoted lever and the clamping means in one direction after the clamping means is released and to oscillate the pivoted lever and clamping means in a return direction after the clamping means has been regripped to rotate the carbon sheet or sheets a portion of a revolution at predetermined intervals.

27. A carbon sheet holding and shifting mechanism for circular carbon sheets to be used with an autographic register comprising a backing plate over which the record sheets are to pass, a lever pivoted between its ends to the underside of the backing plate, clamping means carried by the pivoted lever to hold at least one circular carbon sheet at diametrically opposite points on its periphery over the backing plate, means to release and regrip the clamping means, a slide bar, a cam carried by the slide bar, means operated by the record sheet feeding means to engage the cam and operate the slide bar in one direction, spring means urging the slide bar in the other direction and retaining the clamping means in gripping relation, and a lost motion connection between the slide bar and the pivoted lever to oscillate the pivoted lever and clamping means to release and regrip the clamping means is released and to oscillate the pivoted lever and clamping means in a return direction after the clamping means has been regripped to rotate the carbon sheet or sheets a portion of a revolution at predetermined intervals.

28. A carbon sheet holding and shifting mechanism for circular carbon sheets to be used with an autographic register comprising a backing plate over which the record sheets are to pass, a lever pivoted between its ends to the underside of the backing plate, clamping means carried by each end of the pivoted lever to hold at least one circular carbon sheet at diametrically opposite points on its periphery over the backing plate, means to release and regrip the clamping means, a slide bar carried by the underside of the backing plate, a cam carried by the slide bar, means operated by the record sheet feeding means to engage the cam and operate the slide bar in one direction, and spring means urging the slide bar in the other direction, and a lost motion connection between the slide bar and the pivoted lever to oscillate the pivoted lever and clamping means in one direction after the clamping means is released and to oscillate the pivoted lever and clamping means in a return direction after the clamping means has been regripped to rotate the carbon sheet or sheets a portion of a revolution at predetermined intervals.

29. An autographic register comprising means to contain a plurality of sheets having a relatively long writing space with respect to its width, a writing position for the sheets having a substantial length with respect to its width, means to feed the sheets to the writing position, tandem means to hold a plurality of sets of at least one circular carbon sheet in tandem relation at the writing position, each carbon holding means being positioned so that in tandem relation the writing space is substantially covered by carbon sheets, and means to rotate the carbon sheet holding means for each set of carbon sheet or sheets a portion of a revolution at desired intervals.

30. An autographic register comprising means to contain a plurality of sheets having a relatively long writing space with respect to its width, a writing position for the sheets having a substantial length with respect to its width, means to feed the sheets to the writing position, tandem means to hold a plurality of sets of at least one circular carbon sheet in tandem relation at the writing position, each carbon holding means being positioned so that in tandem relation the writing space is substantially covered by carbon sheets, and means operated by the feeding means to rotate the carbon sheet holding means for each set of carbon sheet or sheets a portion of a revolution at predetermined intervals.

31. An autographic register comprising means to contain a plurality of sheets, a writing position for the sheets, means to feed the sheets to the writing position, tandem clamping means to hold a plurality of sets of at least one circular carbon sheet at diametrically opposite points on the periphery of each set of carbon sheets at the writing position, and means to release the clamping means for each set of carbon sheets, move the same, regrip the clamping means for each set of carbon sheets and return rotate the same to rotate both sets of carbon sheet or sheets a portion of a revolution at desired intervals.

32. An autographic register comprising means to contain a plurality of sheets, a writing position for the sheets, means to feed the sheets to the writing position, tandem clamping means to hold a plurality of sets of at least one circular carbon sheet at diametrically opposite points on the periphery of each set of carbon sheets at the writing position, and means operated by the feeding means to release the clamping means for each set of carbon sheets, rotate the same in one direction, regrip the clamping means for each set of carbon sheets and rotate the same in a return direction to rotate both sets of carbon sheet or sheets a portion of a revolution at desired intervals.

33. An autographic register comprising means to contain a plurality of sheets, a writing plate over which the sheets pass, means to feed the record sheets over the writing plate, a pair of spaced levers pivoted between their ends, clamping means carried by each pivoted lever to hold a pair of sets of at least one circular carbon sheet at diametrically opposite points on their periphery over the writing plate, means to release and regrip the clamping means for each pivoted lever including a single slide bar, and a lost motion connection between the slide bar and the pivoted levers to oscillate the pivoted levers and clamping means in one direction after each clamping means is released and to oscillate the pivoted levers and each clamping means in a return direction after the clamping means has been regripped to rotate both sets of carbon sheet or sheets a portion of a revolution at desired intervals.

34. An autographic register comprising means to contain a plurality of sheets, a writing position for the sheets, means to feed the sheets to the writing position, means to hold at least one circular carbon sheet substantially centrally of the writing position, and means to rotate the holding means for the carbon sheet or sheets a portion of a revolution when the sheets are stationary in writing position.

35. An autographic register comprising means to contain a plurality of sheets, a stationary writing position for the sheets, means to feed the sheets to the writing position, means to hold at least one circular carbon sheet substantially centrally of the writing position including a fixed pivot, and means to rotate the holding means for the carbon sheet or sheets a portion of a revolution at desired intervals.

36. An autographic register comprising means to contain a plurality of sheets, a stationary writing position for the sheets, means to feed the sheets to the writing position, means to hold at least one circular carbon sheet substantially centrally of the writing position including a fixed pivot, and means operated by the feeding means to rotate the holding means for the carbon sheet or sheets a portion of a revolution at predetermined intervals.

HAROLD H. PELZER.